United States Patent
Lockton et al.

(10) Patent No.: US 9,511,287 B2
(45) Date of Patent: Dec. 6, 2016

(54) CELLULAR PHONE GAMES BASED UPON TELEVISION ARCHIVES

(75) Inventors: David B. Lockton, Carmel, CA (US); Mark K. Berner, Santa Clara, CA (US)

(73) Assignee: Winview, Inc., Carmel, CA (US)

( * ) Notice: Subject to any disclaimer, the term of this patent is extended or adjusted under 35 U.S.C. 154(b) by 1141 days.

(21) Appl. No.: 11/542,335

(22) Filed: Oct. 2, 2006

(65) Prior Publication Data
US 2007/0078009 A1    Apr. 5, 2007

Related U.S. Application Data

(60) Provisional application No. 60/723,301, filed on Oct. 3, 2005.

(51) Int. Cl.
| | |
|---|---|
| *A63F 9/24* | (2006.01) |
| *A63F 13/338* | (2014.01) |
| *A63F 13/332* | (2014.01) |
| *A63F 13/30* | (2014.01) |
| *A63F 13/798* | (2014.01) |

(52) U.S. Cl.
CPC ............. *A63F 13/338* (2014.09); *A63F 13/12* (2013.01); *A63F 13/332* (2014.09); *A63F 13/798* (2014.09); *A63F 2300/406* (2013.01); *A63F 2300/409* (2013.01)

(58) Field of Classification Search
CPC ......... A63F 13/06; A63F 13/10; G07F 17/32
USPC ........................................ 463/40, 41, 42, 43
See application file for complete search history.

(56) References Cited

U.S. PATENT DOCUMENTS

| | | | |
|---|---|---|---|
| 4,141,548 A | 2/1979 | Everton | |
| 4,270,755 A | 6/1981 | Willhide et al. | |
| 4,496,148 A | 1/1985 | Morstain et al. | |
| 4,592,546 A | 6/1986 | Fascenda et al. | ................. 273/1 |

(Continued)

FOREIGN PATENT DOCUMENTS

| | | |
|---|---|---|
| CA | 2252021 | 11/1998 |
| CA | 2252074 | 11/1998 |

(Continued)

OTHER PUBLICATIONS

"Two Way TV Patent and Filing Map", www.twowaytv.com/version4/technologies/tech_patents.asp.

(Continued)

*Primary Examiner* — Paul A D'Agostino
(74) *Attorney, Agent, or Firm* — Haverstock & Owens LLP

(57) ABSTRACT

Cellular phone games based on television archives allow users to play games on their cellular phones wherein the games are based on archived television programs. The game is able to be played simultaneously between competitors or on demand. Game data and video data are combined into one file and are sent to participating cellular phones so that the required information is received at the same time at each cellular phone. Each cellular phone contains software to manipulate the game and video data so that the user is able to play the game. The game is played by watching video clips from archived television programs and then selecting choices related to the video clips using the inputs on the user's cellular phone. User scores are determined based on the answers to the questions related to the video clips and results are distributed to the participants.

111 Claims, 3 Drawing Sheets

(56) References Cited

U.S. PATENT DOCUMENTS

| | | | |
|---|---|---|---|
| 4,816,904 A | 3/1989 | McKenna et al. | 179/15 BS |
| 5,013,038 A | 5/1991 | Luxenberg | 273/439 |
| 5,035,422 A | 7/1991 | Berman | 273/439 |
| 5,073,931 A | 12/1991 | Audebert et al. | 380/23 |
| 5,083,271 A | 1/1992 | Thacher et al. | 364/411 |
| 5,083,800 A | 1/1992 | Lockton | 273/439 |
| 5,120,076 A | 6/1992 | Luxenberg et al. | 273/439 |
| 5,213,337 A | 5/1993 | Sherman | 273/439 |
| 5,227,874 A | 7/1993 | Von Kohorn | 358/84 |
| 5,263,723 A | 11/1993 | Pearson et al. | 273/439 |
| 5,283,734 A | 2/1994 | Von Kohorn | 364/412 |
| 5,343,236 A | 8/1994 | Koppe et al. | 348/6 |
| 5,343,239 A | 8/1994 | Lappington et al. | 348/12 |
| 5,462,275 A | 10/1995 | Lowe et al. | 273/94 |
| 5,479,492 A | 12/1995 | Hofstee et al. | 379/92 |
| 5,553,120 A * | 9/1996 | Katz | 379/88.09 |
| 5,566,291 A | 10/1996 | Boulton et al. | |
| 5,585,975 A | 12/1996 | Bliss | |
| 5,586,257 A | 12/1996 | Perlman | 463/42 |
| 5,589,765 A | 12/1996 | Ohmart et al. | |
| 5,643,088 A | 7/1997 | Vaughn et al. | 463/40 |
| 5,663,757 A | 9/1997 | Morales | |
| 5,759,101 A | 6/1998 | Von Kohorn | |
| 5,761,606 A | 6/1998 | Wolzien | |
| 5,762,552 A | 6/1998 | Vuong et al. | 463/25 |
| 5,764,275 A | 6/1998 | Lappington et al. | 348/12 |
| 5,813,913 A * | 9/1998 | Berner et al. | 463/40 |
| 5,818,438 A | 10/1998 | Howe et al. | |
| 5,838,774 A | 11/1998 | Weisser, Jr. | 379/92.02 |
| 5,860,862 A | 1/1999 | Junkin | 463/40 |
| 5,870,683 A * | 2/1999 | Wells et al. | 455/566 |
| 5,916,024 A * | 6/1999 | Von Kohorn | 463/40 |
| 5,970,143 A | 10/1999 | Schneier et al. | 380/23 |
| 5,971,854 A | 10/1999 | Pearson et al. | 463/41 |
| 5,987,440 A | 11/1999 | O'Neil et al. | 705/44 |
| 6,009,458 A | 12/1999 | Hawkins et al. | |
| 6,016,337 A | 1/2000 | Pykalisto | 379/92.02 |
| 6,117,013 A * | 9/2000 | Eiba | 463/41 |
| 6,126,543 A | 10/2000 | Friedman | |
| 6,174,237 B1 | 1/2001 | Stephenson | 463/42 |
| 6,182,084 B1 | 1/2001 | Cockrell et al. | 707/104 |
| 6,193,610 B1 | 2/2001 | Junkin | 463/40 |
| 6,222,642 B1 | 4/2001 | Farrell et al. | |
| 6,233,736 B1 | 5/2001 | Wolzien | |
| 6,251,017 B1 | 6/2001 | Leason et al. | |
| 6,293,868 B1 | 9/2001 | Bernard | |
| 6,312,336 B1 | 11/2001 | Handelman et al. | |
| 6,411,969 B1 | 6/2002 | Tam | |
| 6,416,414 B1 * | 7/2002 | Stadelmann | 463/42 |
| 6,425,828 B2 | 7/2002 | Walker et al. | 463/42 |
| 6,434,398 B1 | 8/2002 | Inselberg | |
| 6,470,180 B1 * | 10/2002 | Kotzin et al. | 455/412.1 |
| 6,524,189 B1 * | 2/2003 | Rautila | 463/40 |
| 6,527,641 B1 | 3/2003 | Sinclair et al. | |
| 6,530,082 B1 | 3/2003 | Del Sesto et al. | |
| 6,536,037 B1 | 3/2003 | Guheen et al. | |
| 6,578,068 B1 | 6/2003 | Bowman-Amuah | 709/203 |
| 6,594,098 B1 | 7/2003 | Sutardja | |
| 6,604,997 B2 | 8/2003 | Saidakovsky et al. | 463/9 |
| 6,610,953 B1 | 8/2003 | Tao et al. | |
| 6,648,760 B1 | 11/2003 | Nicastro | 463/23 |
| 6,659,860 B1 | 12/2003 | Yamamoto et al. | |
| 6,659,872 B1 * | 12/2003 | Kaufman et al. | 463/40 |
| 6,690,661 B1 | 2/2004 | Agarwal et al. | |
| 6,718,350 B1 | 4/2004 | Karbowski | |
| 6,752,396 B2 * | 6/2004 | Smith | 273/429 |
| 6,758,754 B1 | 7/2004 | Lavanchy et al. | 463/42 |
| 6,758,755 B2 | 7/2004 | Kelly et al. | |
| 6,760,595 B2 | 7/2004 | Inselberg | 455/517 |
| 6,763,377 B1 | 7/2004 | Belknap et al. | 709/223 |
| 6,766,524 B1 | 7/2004 | Matheny et al. | |
| 6,774,926 B1 | 8/2004 | Ellis et al. | |
| 6,785,561 B1 * | 8/2004 | Kim | 455/566 |
| 6,801,380 B1 | 10/2004 | Sutardja | |
| 6,806,889 B1 * | 10/2004 | Malaure et al. | 715/733 |
| 6,807,675 B1 | 10/2004 | Maillard et al. | 725/35 |
| 6,811,482 B2 | 11/2004 | Letovsky | |
| 6,817,947 B2 | 11/2004 | Tanskanen | 463/41 |
| 6,824,469 B2 | 11/2004 | Allibhoy et al. | 463/40 |
| 6,840,861 B2 | 1/2005 | Jordan et al. | 463/42 |
| 6,846,239 B2 * | 1/2005 | Washio | 463/40 |
| 6,857,122 B1 | 2/2005 | Takeda et al. | |
| 6,863,610 B2 | 3/2005 | Vancraeynest | 463/41 |
| 6,871,226 B1 | 3/2005 | Ensley et al. | |
| 6,873,610 B1 | 3/2005 | Noever | |
| 6,884,172 B1 * | 4/2005 | Lloyd et al. | 463/42 |
| 6,887,159 B2 | 5/2005 | Leen et al. | 463/42 |
| 6,893,347 B1 * | 5/2005 | Zilliacus et al. | 463/41 |
| 6,942,574 B1 | 9/2005 | LeMay et al. | 463/41 |
| 6,960,088 B1 | 11/2005 | Long | |
| 7,035,653 B2 * | 4/2006 | Simon et al. | 455/466 |
| 7,116,310 B1 | 10/2006 | Evans et al. | |
| 7,125,336 B2 | 10/2006 | Anttila et al. | |
| 7,169,050 B1 | 1/2007 | Tyler | |
| 7,192,352 B2 | 3/2007 | Walker et al. | |
| 7,194,758 B1 | 3/2007 | Waki et al. | |
| 7,240,093 B1 | 7/2007 | Danieli et al. | |
| 7,244,181 B2 | 7/2007 | Wang et al. | |
| 7,254,605 B1 | 8/2007 | Strum | 709/203 |
| 7,288,027 B2 | 10/2007 | Overton | |
| 7,347,781 B2 * | 3/2008 | Schultz | 463/42 |
| 7,351,149 B1 | 4/2008 | Simon et al. | |
| 7,379,705 B1 | 5/2008 | Rados et al. | |
| 7,502,610 B2 | 3/2009 | Maher | |
| 7,517,282 B1 | 4/2009 | Pryor | |
| 7,562,134 B1 | 7/2009 | Fingerhut et al. | |
| 7,630,986 B1 | 12/2009 | Herz et al. | |
| 7,753,789 B2 * | 7/2010 | Walker et al. | 463/42 |
| 7,780,528 B2 * | 8/2010 | Hirayama | 463/40 |
| 7,828,661 B1 | 11/2010 | Fish | |
| 7,907,211 B2 | 3/2011 | Oostveen et al. | |
| 7,976,389 B2 * | 7/2011 | Cannon et al. | 463/42 |
| 8,006,314 B2 | 8/2011 | Wold | |
| 8,028,315 B1 | 9/2011 | Barber | |
| 8,082,150 B2 | 12/2011 | Wold | |
| 8,086,445 B2 | 12/2011 | Wold et al. | |
| 8,107,674 B2 | 1/2012 | Davis et al. | |
| 8,109,827 B2 * | 2/2012 | Cahill et al. | 463/27 |
| 8,176,518 B1 | 5/2012 | Junkin et al. | |
| 8,353,763 B2 | 1/2013 | Amaitis et al. | |
| 8,708,789 B2 | 4/2014 | Asher et al. | |
| 9,076,303 B1 | 7/2015 | Park | |
| 9,098,883 B2 | 8/2015 | Asher et al. | |
| 2001/0004609 A1 | 6/2001 | Walker et al. | |
| 2001/0005670 A1 | 6/2001 | Lahtinen | |
| 2001/0020298 A1 | 9/2001 | Rector, Jr. et al. | |
| 2001/0036272 A1 * | 11/2001 | Hirayama | 380/240 |
| 2001/0036853 A1 | 11/2001 | Thomas | |
| 2002/0010789 A1 * | 1/2002 | Lord | 709/231 |
| 2002/0029381 A1 | 3/2002 | Inselberg | |
| 2002/0042293 A1 * | 4/2002 | Ubale et al. | 463/9 |
| 2002/0054088 A1 | 5/2002 | Tanskanen | 345/744 |
| 2002/0055385 A1 | 5/2002 | Otsu | |
| 2002/0056089 A1 | 5/2002 | Houston | 725/9 |
| 2002/0059623 A1 | 5/2002 | Rodriguez et al. | |
| 2002/0078176 A1 * | 6/2002 | Nomura et al. | 709/219 |
| 2002/0103696 A1 | 8/2002 | Huang et al. | |
| 2002/0108125 A1 | 8/2002 | Joao | |
| 2002/0108127 A1 * | 8/2002 | Lew et al. | 725/142 |
| 2002/0115488 A1 | 8/2002 | Berry et al. | |
| 2002/0124247 A1 | 9/2002 | Houghton | 725/9 |
| 2002/0132614 A1 | 9/2002 | Vanluijt et al. | |
| 2002/0133827 A1 | 9/2002 | Newnam et al. | |
| 2002/0157002 A1 * | 10/2002 | Messerges et al. | 713/155 |
| 2002/0159576 A1 | 10/2002 | Adams | |
| 2002/0162031 A1 | 10/2002 | Levin et al. | |
| 2002/0177483 A1 | 11/2002 | Cannon | |
| 2003/0013528 A1 * | 1/2003 | Allibhoy et al. | 463/42 |
| 2003/0040363 A1 | 2/2003 | Sandberg | |
| 2003/0060247 A1 | 3/2003 | Goldberg et al. | |
| 2003/0069828 A1 | 4/2003 | Blazey et al. | 705/37 |
| 2003/0070174 A1 | 4/2003 | Solomon | |
| 2003/0078924 A1 | 4/2003 | Liechty et al. | |
| 2003/0086691 A1 | 5/2003 | Yu | |

(56) References Cited

U.S. PATENT DOCUMENTS

| | | |
|---|---|---|
| 2003/0087652 A1* | 5/2003 | Simon et al. ............... 455/466 |
| 2003/0114224 A1 | 6/2003 | Anttila et al. |
| 2003/0144017 A1 | 7/2003 | Inselberg ................ 455/517 |
| 2003/0154242 A1 | 8/2003 | Hayes ....................... 709/203 |
| 2003/0177167 A1 | 9/2003 | Lafage et al. |
| 2003/0177504 A1 | 9/2003 | Paulo et al. |
| 2003/0195023 A1* | 10/2003 | Di Cesare ..................... 463/9 |
| 2003/0208579 A1 | 11/2003 | Brady et al. |
| 2003/0211856 A1 | 11/2003 | Zilliacus |
| 2003/0212691 A1 | 11/2003 | Kuntala et al. |
| 2003/0216185 A1* | 11/2003 | Varley ........................ 463/42 |
| 2003/0216857 A1 | 11/2003 | Feldman et al. |
| 2004/0014524 A1* | 1/2004 | Pearlman ..................... 463/30 |
| 2004/0022366 A1 | 2/2004 | Ferguson et al. |
| 2004/0060063 A1 | 3/2004 | Russ et al. |
| 2004/0088729 A1 | 5/2004 | Petrovic et al. |
| 2004/0093302 A1 | 5/2004 | Baker et al. ................. 705/37 |
| 2004/0117831 A1 | 6/2004 | Ellis et al. |
| 2004/0117839 A1 | 6/2004 | Watson et al. ............... 725/87 |
| 2004/0128319 A1* | 7/2004 | Davis et al. .............. 707/104.1 |
| 2004/0148638 A1* | 7/2004 | Weisman et al. ........... 725/115 |
| 2004/0152454 A1 | 8/2004 | Kauppinen |
| 2004/0158855 A1 | 8/2004 | Gu et al. ..................... 725/39 |
| 2004/0178923 A1 | 9/2004 | Kuang ..................... 340/825.72 |
| 2004/0183824 A1* | 9/2004 | Benson ................ G06F 9/4443 715/767 |
| 2004/0198495 A1 | 10/2004 | Cisneros et al. .............. 463/24 |
| 2004/0203667 A1 | 10/2004 | Schroeder et al. |
| 2004/0203898 A1 | 10/2004 | Bodin et al. |
| 2004/0224750 A1 | 11/2004 | Al-Ziyoud |
| 2004/0242321 A1 | 12/2004 | Overton ..................... 463/29 |
| 2005/0021942 A1 | 1/2005 | Diehl et al. |
| 2005/0026699 A1* | 2/2005 | Kinzer et al. ............... 463/43 |
| 2005/0043094 A1* | 2/2005 | Nguyen et al. .............. 463/42 |
| 2005/0060219 A1 | 3/2005 | Deitering et al. |
| 2005/0076371 A1 | 4/2005 | Nakamura ................... 725/75 |
| 2005/0097599 A1 | 5/2005 | Plotnick et al. |
| 2005/0101309 A1 | 5/2005 | Croome |
| 2005/0113164 A1 | 5/2005 | Buecheler et al. |
| 2005/0131984 A1 | 6/2005 | Hofmann et al. |
| 2005/0138668 A1 | 6/2005 | Gray et al. |
| 2005/0210526 A1 | 9/2005 | Levy et al. |
| 2005/0235043 A1 | 10/2005 | Teodosiu et al. |
| 2005/0255901 A1* | 11/2005 | Kreutzer ....................... 463/9 |
| 2005/0266869 A1 | 12/2005 | Jung |
| 2005/0273804 A1 | 12/2005 | Preisman |
| 2005/0288101 A1 | 12/2005 | Lockton et al. |
| 2005/0288812 A1 | 12/2005 | Cheng et al. |
| 2006/0025070 A1 | 2/2006 | Kim et al. |
| 2006/0046810 A1* | 3/2006 | Tabata .................... A63F 13/12 463/9 |
| 2006/0047772 A1 | 3/2006 | Crutcher |
| 2006/0059161 A1 | 3/2006 | Millett et al. ................ 707/10 |
| 2006/0063590 A1* | 3/2006 | Abassi et al. ................ 463/29 |
| 2006/0087585 A1* | 4/2006 | Seo ................ H04N 21/25808 348/385.1 |
| 2006/0089199 A1 | 4/2006 | Jordan et al. |
| 2006/0135253 A1 | 6/2006 | George et al. |
| 2006/0148569 A1* | 7/2006 | Beck ........................... 463/43 |
| 2006/0156371 A1 | 7/2006 | Maetz et al. |
| 2006/0174307 A1 | 8/2006 | Hwang et al. |
| 2006/0205483 A1 | 9/2006 | Meyer et al. |
| 2006/0248553 A1 | 11/2006 | Mikkelson et al. |
| 2006/0269120 A1 | 11/2006 | Nehmadi et al. |
| 2007/0004516 A1 | 1/2007 | Jordan et al. |
| 2007/0019826 A1 | 1/2007 | Horbach et al. |
| 2007/0037623 A1 | 2/2007 | Romik |
| 2007/0083920 A1 | 4/2007 | Mizoguchi et al. |
| 2007/0106721 A1 | 5/2007 | Schloter |
| 2007/0162328 A1 | 7/2007 | Reich |
| 2007/0174870 A1 | 7/2007 | Nagashima et al. |
| 2007/0226062 A1 | 9/2007 | Hughes et al. |
| 2007/0238525 A1 | 10/2007 | Suomela |
| 2007/0243936 A1 | 10/2007 | Binenstock et al. |
| 2007/0244570 A1 | 10/2007 | Speiser et al. |
| 2007/0244585 A1 | 10/2007 | Speiser et al. |
| 2007/0244749 A1 | 10/2007 | Speiser et al. |
| 2007/0265089 A1* | 11/2007 | Robarts ................ A63F 13/12 463/42 |
| 2008/0076497 A1 | 3/2008 | Kiskis et al. |
| 2008/0169605 A1 | 7/2008 | Shuster et al. |
| 2008/0270288 A1 | 10/2008 | Butterly et al. |
| 2008/0288600 A1 | 11/2008 | Clark |
| 2009/0163271 A1 | 6/2009 | George et al. |
| 2009/0234674 A1 | 9/2009 | Wurster |
| 2010/0099421 A1 | 4/2010 | Patel et al. |
| 2010/0099471 A1 | 4/2010 | Feeney et al. |
| 2010/0120503 A1 | 5/2010 | Hoffman et al. |
| 2010/0137057 A1 | 6/2010 | Fleming |
| 2010/0279764 A1 | 11/2010 | Allen et al. |
| 2011/0130197 A1 | 6/2011 | Bytnar et al. |
| 2011/0227287 A1 | 9/2011 | Reabe |
| 2011/0269548 A1 | 11/2011 | Barclay et al. |
| 2012/0264496 A1 | 10/2012 | Behrman et al. |
| 2012/0282995 A1 | 11/2012 | Allen et al. |
| 2013/0005453 A1 | 1/2013 | Nguyen et al. |
| 2014/0100011 A1 | 4/2014 | Gingher |
| 2014/0128139 A1 | 5/2014 | Shuster et al. |
| 2014/0279439 A1 | 9/2014 | Brown |
| 2015/0067732 A1 | 3/2015 | Howe et al. |

FOREIGN PATENT DOCUMENTS

| | | | |
|---|---|---|---|
| CA | 2279069 | 7/1999 | |
| CA | 2287617 | 10/1999 | |
| EP | 0 649 102 A3 | 6/1996 | |
| GB | 2364485 | 1/2002 | |
| NZ | 330242 | 10/1998 | |
| WO | WO 01/65743 A1 | 9/2001 | ............... H04H 1/00 |
| WO | 02/03698 A1 | 10/2002 | |
| WO | WO 2005024506 * | 7/2005 | ............. G06F 17/60 |
| WO | 2008027811 A2 | 3/2008 | |
| WO | 2008115858 A1 | 9/2008 | |

OTHER PUBLICATIONS

"Ark 4.0 standard edition, Technical Overview," www.twowaytv.com/version4/technologies/tech_ark_professional.asp.

"Understanding the Interactivity Between Television and Mobile Commerce", Robert Davis and David Yung, Communications of the ACM, Jul. 2005, vol. 48, No. 7, pp. 103-105.

"Re: Multicast Based Voting System," www.ripe.net/ripe/maillists/archives/mbone-eu-op/1997/msg00100html.

"IST and Sportal.com: Live on the Internet Sep. 14, 2004 by Clare Spoonheim", www.isk.co.usk/NEWS/dotcom/ist_sportal.html.

"Modelling User Behaviour in Networked Games by Tristan Henderson and Saleem Bhatti", www.woodworm.cs.uml.edu/rprice/ep/henderson.

"SMS Based Voting and Survey System for Meetings", WWW.abbit.be/technology/SMSSURVEY.htm.

"PurpleAce Launches 3GSM Ringtone Competition", www.wirelessdevnet.com/news/2005/jan/31/news6html.

"On the Performance of Protocols for Collecting Responses over a Multiple-Access Channel", Mostafa H. Ammar and George N. Rouskas, IEEE INFOCOM '91, pp. 1490-1499, vol. 3, IEEE, New York, NY.

Meriam-Webster, "Game" definition, <http://www.merriam-webster.com/dictionary/agme>pg. 1.

Ducheneaut et al., "The Social Side of Gaming: A Study of Interaction Patterns in a Massively Multiplayer Online Game,", Palo Alto Research Center, Nov. 2004, vol. 6, Issue 4, pp. 360-369.

* cited by examiner

CELLULAR PHONE GAMES BASED UPON TELEVISION ARCHIVES

RELATED APPLICATION(S)

This Patent Application claims priority under 35 U.S.C. §119(e) of the co-owned U.S. Provisional Patent Application No. 60/723,301, filed Oct. 3, 2005, and entitled "CELLULAR PHONE GAMES BASED UPON TELEVISION ARCHIVES" which is also hereby incorporated by reference in its entirety.

FIELD OF THE INVENTION

The present invention relates to the field of distributed entertainment. More specifically, the present invention relates to the field of distributed entertainment utilizing a computing device where the entertainment corresponds to a previously broadcast archived television program.

BACKGROUND OF THE INVENTION

In the United States alone there are over 170 million registered cellular phones. With the expiration of the U.S. Pat. No. 4,592,546 to Fascenda and Lockton, companies are able to now use the cellular phone and other mobile communication devices utilizing a multicast network to control television viewers in games of skill based upon predicting, for example, what the quarterback may call on the next play within a football game. In addition, games of skill with a common start time can be conducted simultaneously among cellular phone owners, based on classic card, dice, trivia, and other games. In order to avoid the anti-gaming laws in the various states, the winners must be determined by the relative skill, experience and practice of the player in each discrete game.

To date, the televised talent show American Idol® is the most notable marriage of the cellular phone and television viewers in the United States. During the live final events of this nationwide televised talent contest, AT&T® cellular phone subscribers were permitted to vote for their favorite contestant. Over 60 million chose to do so. The results of those votes determined the final winners. Other live television shows incorporate user interactivity via a cellular phone where the users are able to send a text message with their selection or dial a choice such as on the television program So You Think You Can Dance.

AirPlay Network, Inc. launched a nationwide service on Sep. 7, 2006 enabling viewers of televised football games to compete with each other utilizing their cellular phone while watching the telecast. However, for viewers that are unable to play along with live events, live television programs or tape-delayed broadcasts or who want a comparable experience, any time and any place, there is a need for additional gaming possibilities.

SUMMARY OF THE INVENTION

Cellular phone games based on television archives allow users to play games on their cellular phones wherein the games relate to archived television programs. Game data and video data are combined into one file and are streamed, broadcast or multicast to participating cellular phones so that the required information is received at the same time at each cellular phone or alternatively, downloaded and launched at the same time. Each cellular phone contains software to manipulate the game and video data so that the user is able to play the game. The game is played by watching video clips from archived television programs and then selecting choices related to the video clips using the interface on the user's cellular phone. User scores are determined based on the answers to the questions or predictions related to the video clips.

In one aspect, a method of playing a game based on archived television programs, comprises receiving one or more video files and one or more game data files and operating a cellular based program to display video data and game data from the one or more video files and the one or more game data files. The files are downloaded to the cellular phone prior to the scheduled start time. The method further comprises receiving a game start signal and starting the game. The method further comprises playing the game by selecting one or more choices related to the video data. The one or more video files and the one or more game data files are received in a combined file. The video data and the game data are displayed simultaneously. A third method has all players receiving a multicast, broadcast or other form of one to many broadcasts in real time. The method further comprises collecting scores and reporting performance to participants to a cellular phone. The method further comprises prohibiting further input with a lockout signal. The one or more video files and the one or more game data files are compressed. The game data contains graphic information in addition to the video data. The graphic information is displayed as crawling information, as closed captioned information, as a picture in picture or as graphically overlayed. The one or more video files and the one or more game data files are received in advance of a scheduled start. The method further comprises transmitting the one or more video files and the one or more game data files on a single TCP, UDP, 3G, multicast or broadcast transmission. Examples are the Media Flo network being deployed by Qualcomm®, Verizon Wireless® and Sprint® or the utilization of a 3G cellular network in either TCP connection or multicast mode, or the broadcast of digital data in a digital radio or television transmission or in the subcarrier thereof. Transmitting is digital broadcasting, individual streaming or downloading. The game is played simultaneously live, on demand competitively or as on demand practice. A set of digital audio is received with the one or more video files and the one or more game data files. A user is able to identify remote competitors prior to the game to challenge and compete against in a challenge game. After all of the challenged competitors complete the challenge game, results are sent to the challenged competitors including rankings. In some aspects, the user utilizes the Internet to identify remote competitors to challenge and compete against. The one or more video files and the one or more game data files are simultaneously broadcast to all participants at a specific time. The one or more video files and the one or more game data files are pre-produced. The archived television programs include sporting events, game shows or entertainment shows. One or more segments of the archived television programs are included in the one or more video files. The one or more segments can be between five minutes and twenty minutes. The method further comprises digitizing analog video. The one or more video files and the one or more game data files are received over a wireless cellular network. The video data and the game data are synchronously displayed. A record of episodes played by the user is maintained on a server to ensure the user receives a never-before played game by the user.

In another aspect, a method of playing a game based on a segment of an archived television program, comprises transmitting a set of files from a server over a wireless cellular network, the set of files comprises one or more pre-produced video files, wherein the one or more pre-produced video files contain video data, one or more game data files, wherein the one or more game data files contain game data, further wherein the game data contains graphic information in addition to the video data and one or more audio files, receiving the set of files on a cellular phone, operating a cellular based program contained on the cellular phone to synchronously display the video data and the game data and playing the game by selecting one or more choices. The set of files is assembled into a combined file. The method further comprises collecting scores and reporting performance to participants from the cellular phone. The graphic information is displayed as crawling information, as closed captioned information, as a picture in picture or as a graphic overlay. The set of files contains compressed data. The set of files is received in advance of a scheduled start. Transmitting the set of files is on a single TCP, UDP, 3G, multicast or broadcast transmission. Transmitting is digital broadcasting, individual streaming or downloading. The game is played simultaneously live, on demand competitively or as on demand practice. A user is able to identify remote competitors prior to the game to challenge and compete against in a challenge game. After all of the challenged competitors complete the challenge game, results are sent to the challenged competitors including rankings. The set of files is simultaneously broadcast to all participants at a specific time. The archived television program includes sporting events, game shows or entertainment shows.

In yet another aspect, a system for producing and distributing a game based on archived television programs, comprises a game production device for grouping video data and game data into a set of files and a first server coupled to the game production device, wherein the server receives and transmits the set of files. The set of files is assembled into a combined file. The video data and the game data allow a user to play the game by selecting one or more choices related to the video data. The system further comprises a second server coupled to the first server for receiving scoring data, determining standings and communicating the standings to participants. In some embodiments, the first server and the second server are contained within a single server device. The system further comprises a cellular service operator coupled to the first server and a wireless network for transmitting the set of files from the server to the wireless network. The set of files contains compressed data. The set of files is transmitted on a single TCP, UDP, 3G, multicast or broadcast transmission. Transmitting is digital broadcasting, individual streaming or downloading. The game is played simultaneously live, on demand competitively or as on demand practice. A set of digital audio is grouped into the set of files. The set of files is simultaneously broadcast to all participants at a specific time. The video data and the game data are pre-produced. The archived television programs include sporting events, game shows or entertainment shows. One or more segments of the archived television programs are included in the video data. The one or more segments are between five minutes and twenty minutes.

In another aspect, a device for playing a game based on archived television programs, comprises a cellular phone, wherein the cellular phone receives a set of files, wherein the set of files contain video data and game data and utilizes a program to present the video data and the game data to a user. The set of files is assembled into a combined file. The video data and the game data are displayed simultaneously. The game data contains graphic information in addition to the video data. The graphic information is displayed as crawling information, as closed captioned information, as a picture in picture or as a graphic overlay. The video data and the game data are synchronized. The game is transmitted to the cellular phone using digital broadcasting, individual streaming or downloading. The game is played simultaneously live, on demand competitively or as on demand practice. The user is able to identify remote competitors prior to the game to challenge and compete against in a challenge game. After all of the challenged competitors complete the challenge game, results are sent to the challenged competitors including rankings. Standings information is received from a server. The video data and the game data are pre-produced. The archived television programs include sporting events, game shows or entertainment shows. One or more segments of the archived television programs are included in the video data.

In yet another aspect, a network of devices for playing a game based on archived television programs, comprises a game production device for combining video data with game data into a combined file a first server coupled to the game production device, wherein the server receives and transmits the combined file and a plurality of devices coupled to the first server through a wireless network, wherein the plurality of devices receive the combined file and utilize a program and the combined file to present the video data and the game data to a user. The video data and the game data allow the user to play the game by selecting one or more choices related to the video data. The plurality of devices are selected from the group consisting of cellular phones, personal computers, laptops and PDAs. The combined file is received substantially simultaneously at each of the devices. The network of devices further comprises a second server coupled to the wireless network for receiving scoring data and determining standings. In some embodiments, the first server and the second server are contained within a single server device. Standings information and results are transmitted to participants. The network of devices further comprises a cellular service operator coupled to the first server and the wireless network for transmitting the combined file to the wireless network. The video data and the game data are displayed simultaneously. The combined file contains compressed data. The game data contains graphic information in addition to the video data. The graphic information is displayed as crawling information, as closed captioned information, as a picture in picture or as a graphic overlay. The combined file is transmitted on a single TCP, UDP, 3G, multicast or broadcast transmission. Transmitting is digital broadcasting, individual streaming or downloading. The game is played simultaneously live, on demand competitively or as on demand practice. A set of digital audio is combined into the combined file. The user is able to identify remote competitors prior to the game to challenge and compete against in a challenge game. The competitors are able to play the game when convenient. After all of the challenged competitors complete the challenge game, results are sent to the challenged competitors including rankings. The combined file is simultaneously broadcast to all participants at a specific time. The video data and the video data are pre-produced. The archived television programs include sporting events, game shows or entertainment shows. One or more segments of the archived television programs are included in the video data. The one or more segments are between five minutes and twenty minutes. The video and the game data are synchronized. The network of devices further comprises an Internet for registering a group of competitors.

DETAILED DESCRIPTION OF THE PREFERRED EMBODIMENT

Figure 1:
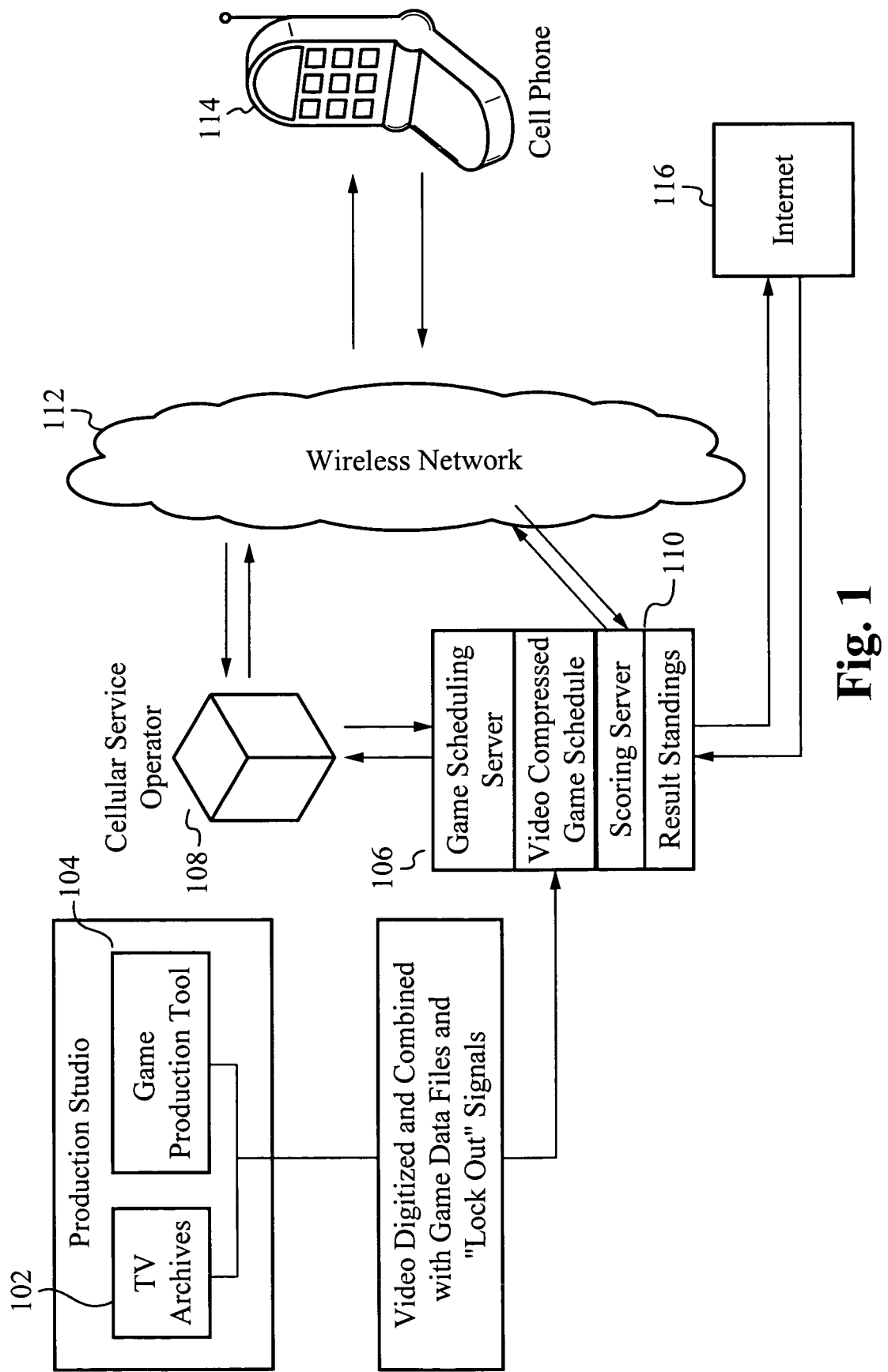
FIG. 1 illustrates a graphical representation of the preferred embodiment of the present invention.

The present invention includes systems and methodologies for generating, producing, distributing, and playing games on cellular phones and other mobile devices based on archived video of previously broadcast television programming. The game play is similar to games of skill based on live television broadcasts described in prior patents by some of the current inventors. The U.S. Pat. No. 4,592,546 to Lockton (expired in April 2004), herein incorporated by reference, teaches a methodology for conducting games of skill utilizing two separate mass media in connection with live and taped television broadcasts. U.S. Pat. No. 5,083,800 to Lockton, herein incorporated by reference, similarly applies a separate mass media to control computer and video games played simultaneously. Prior art developed at Interactive Network, in operation from 1989 until 1995 taught a methodology for producing large scale simultaneously played games of skill in conjunction with the broadcast of prerecorded game shows such as Wheel of Fortune® and Jeopardy®.

For Jeopardy!®, for example, the preproduction of three additional wrong answers were created with the cooperation of the producers of the television shows in advance of the airing of the telecast. These game data files were precisely time synchronized with the video tape of the game show provided in advance and stored on a broadcast server. A means of mass communication (data broadcasting) separate from the television broadcast, for example, a network of FM stations utilizing the SCA sub carrier, or the vertical blanking interval (VBI) of the television signal, were leased from broadcasters on a market by market basis. The separate mass media multicast the digital data files to a wireless data receiver in the participant's possession. Through the visual observation of the "live" telecast of the syndicated television show in each market, the game show pre-produced synchronized data files, usually a half hour in duration, were manually synchronized at the beginning of the telecast. The synchronization was monitored throughout the telecast, as the telecast paused for the insertion of local and national commercials and then resumed. These pre-produced data files contained "lock out" signals prohibiting answers past the revelation of the correct answers, which were utilized by game software residing in the wireless data receiver. The software created an individual performance file, generally based on total point scores for each participant receiving the data files simultaneously within their television market, precisely synchronized with a separately broadcast television signal.

In addition to television based games, Interactive Network utilized a methodology for conducting games of skill based upon classic card, dice, word, and trivia games. The production of these games involved the creation of a digital file for the game, including questions and then the correct answers to be revealed to the competitor after a "lock out" prohibited further response for a trivia game, for example. The entire files containing both questions and answers were broadcast prior to the start of the game to all subscribers who indicated their intention to participate. After the countdown to a prescheduled start time, all of the competitors games were launched with a one-way signal broadcast to the participants, and the files "played" for a duration of 10- to 15-minutes until their conclusion.

The current state-of-the-art in cellular phone based entertainment includes downloadable games covering virtually every genre of game that can currently be enjoyed on the computer and video game platforms. In addition, new broadband transmission technology generally referred to in cellular telephony as "third generation" or 3G, has enabled viewing of video clips on the cellular phone either by streaming the digital video files using the Internet, or downloading compressed files and then "playing" them on the cellular phone's LCD color display. Companies like Verizon Wireless® and Qualcomm® are utilizing these technologies in connection with content owners to download television clips of news broadcasts, highlights of sporting events, and other television entertainment on an on demand basis to cellular subscribers. Qualcomm® recently announced its Media Flo project which has the capability of broadcasting live televised events or clips from these events, such as NFL® Football, for display and viewing on a cellular telephone color LCD display.

The present invention includes systems and methodologies for providing games of skill and chance, playable either on demand or simultaneously by cellular subscribers, whereby the underlying event upon which the game play is based is archival video footage such as football, baseball, basketball, or other sporting events or game shows (Wheel of Fortune® or Jeopardy!®), or other television entertainment which has already been broadcast.

The present invention utilizes the following methods in the production, game play, and display.

Game Production

All television programmers maintain video taped archives of every program they have produced and aired dating back to at least 1960. Segments of suitable length of once televised sporting events or game shows, generally between 5- and 10-minutes, are selected by the producers of such a game service. For example, in the case of football-based cellular phone games, a scoring drive from a 1980 Super Bowl Game between the Pittsburgh Steelers and Los Angeles Rams of a 10-minute duration is selected. In the case of a game show, a 7-minute "round" from a Jeopardy!® telecast aired in the past is selected. The duration of each selection may vary as desired.

The analog video files are digitized utilizing a variety of standard methodologies in an appropriate format for broadcast utilizing a wireless cellular or broadcast network. Game producers generate data files to support a competitive game of skill or chance which is precisely synchronized with the digitized video files, using a game production tool. In the case of football, these data files, as taught in the Interactive Network prior art and the Lockton patents, contain "lockout" signals prohibiting further input, a determination of whether each play was a short or long pass, a run to the right, or left based on observation of the video file of the game. Point values are assessed for correct or incorrect answers, and the game play is played similarly to that described as in the aforementioned prior art. In the case of a Jeopardy!® game show, three wrong answers are created and the four multiple choices including the correct answer for each Jeopardy!® question selected are produced.

In the production process, the game data file is time synchronized precisely with the video file, utilizing the game production tool.

When playing, the user selects answers 1, 2, 3, or 4 on his cellular phone to answer the question before a time stamped "lockout" signal contained in the game file, precluding further input. When the correct answer is selected by the television contestant, then the point values for the correct answer are incremented or decremented by software in the game file, depending on whether the competitor is right or wrong with their selection.

The digitized video files, and the separately produced overlying game play file are then either combined for streaming or broadcast into a single data file, maintained as two data files, or an alternate methodology is utilized to ensure that both files are broadcast simultaneously on a single TCP, UDP, 3G, multicast, broadcast or other transmission, utilizing current data compression capabilities. Any appropriate transmission methodology is utilized, including WiFi. The game data files contain graphic information separate from the video of the game telecast, such as the selection options, for example "run," "pass," for a game based on a football telecast. Separate digital sound tracks, one from the television programming, and one related to the game programming are also able to be combined for a single transmission. In other words, data is able to be either A) downloaded in advance or B) streamed or C) broadcast. The different types of data: 1) digitized video and audio, 2) graphic game play data, 3) audio enhancements, are able to be either combined with each other or sent separately. Therefore, users are able to play simultaneously wherein the video, audio and game play data are received by streaming, broadcasting or downloaded using a simultaneous start time. Users are also able to play on demand wherein the video, audio and game play data are received when requested by streaming, broadcasting or downloaded. Users are also able to practice with on demand games where they are not competing against other players. Regardless of how these discreet pieces of information are delivered to the phone, software resident on the phone ensures that the game play data and audio are synchronized with the video archive.

Game Play

Under this methodology, a user on an ad hoc basis, or as a subscriber to a service or charging the required fee to their cellular telephone bill, indicates their desire to participate in a contest based upon the old television program. The contests have a specific start time, displayed on the cellular phone, such as, for example, "1980 Super Bowl game, 3:15 pm," or in an alternative embodiment, the menu on the cellular phone describes a game played at any time by the cellular phone owner by selecting it from a menu on the cellular phone. Upon selecting this game from the menu, the underlying video and data files are streamed or downloaded to the cellular phone, and the video of the underlying telecast sporting event, game show, or other entertainment program, is displayed on the cellular phone utilizing software permanently or temporarily resident on a cellular phone client designed to display full motion video. A record of what episodes of what games have been played for an individual subscriber is maintained on the service's server to ensure a subscriber always receives a game they have not played before.

On Demand Games Against Friends

For games not played simultaneously in real time, a subscriber playing an on demand game has the ability, utilizing the cellular phone display, to add the telephone number, subscriber pseudo-name, or other identification of friends who are also subscribers with whom he wishes to match his score in the game about to be played. In an alternate method, a user is able to use a web site to select whom he is going to compete against. This information is registered on a central game management/scheduling server, and the subscribers selected are immediately notified when they access the game provider's main menu or at some other time. When, for example, a football game is played by the subscriber wishing to compare his score with friends, this specific game is identified on the server so that when and if those friends who are challenged and notified, selected a football game for play, the identical game previously played and identified is streamed or downloaded to their new competitors. At the conclusion of the game of the last player challenged, the scores of all the cohort players are transmitted to all the competitor's cellular phones, so that they can determine the relative ranking of their scores.

Additional Kinds of Content

In addition to games played with televised sports and game show footage utilizing the methods described, cellular phone games are able to be based upon a unique repurposing of existing archival television footage from a variety of television genres. For example, a game based on a sitcom, such as the discontinued Seinfeld show, is able to utilize short clips of a scene, and then ask viewers to answer questions related to the predicted resolution of the issue, problem, or situation seen in the short clip. People also are able to be shown historic, memorable sports plays, for example, football passes, runs, catches, or highlighted events from a variety of sports telecasts, and then asked to identify the participants, the year the clip was from, and the outcome. Any type of question/answer related to an archived program is possible and is not limited to those described above. In each scenario, however, the video footage and the overlying game aspect is pre-produced, combined and transmitted for display and game play.

Game Display

The data files which manage the game play, received simultaneously, also utilize software resident on the client for managing the display on the phone's LCD. This game software is able to be a separate "gaming client" or an "all in one" application which addresses the video and game elements. The game data graphics are also able to be presented to the player by overlaying the text and symbols over the television footage, or in the alternative, utilize a separate portion of the cellular phone's display for this information, at the option of the producers. An example of this latter approach is the crawling information displayed at the bottom of a television screen containing stock ticker information or the way closed captioning information is displayed on television screens. In the alternative, a picture in picture (PIP) approach is also able to be used to separately display game play information from the underlying television footage. In another alternative, the game play information is simply superimposed on top of the video.

Under this invention, the subscriber would play along with the 5- to 15-minute television segment of the game until its conclusion, and would be informed at the end, based upon software resident in the phone, what their total points earned are. In some embodiments, the segments are longer or shorter. By transmitting this game performance information to a central server for compilation, the competition would receive information on how their score relates to the scores achieved by other players of the game. Under the "on demand" game play format, users are able to selectively play against friends, and prizes would generally not be awarded, since the person could play the game as many times as they desire, or obtain the answers from someone who had played.

Games Based on Simultaneous Broadcast

In an alternative embodiment, the combined video and game data files produced by the same methodology described above is able to be simultaneously broadcast to all participants at a specific time, such as every 15-minutes, to all of the players who have registered their intention to play a specific game. In this format, these files would be individually streamed, or in the alternative, digitally broadcast, precisely at the same time to all participants. Another approach is to download the data through streaming, broadcast or other downloading technique in advance. Under this approach, the application ensures that the video and game play started at the appropriate time. This is able to be done by signaling a "start" signal to all players.

While game play unfolds in a manner similar to that described in U.S. Pat. No. 4,592,546, a significant difference in this invention and the prior art, is that all of the information utilized for the game is pre-produced and combined in a single data file, and received simultaneously by all participating cellular phones broadcast, to be separated and displayed for simultaneous viewing on a cellular phone by the methods described above. While the games unfold to the participant in virtually the same manner as a game based upon a live telecast of a sporting event or game show, the cellular phone is not utilized as a receiving device for a second mass media communications synchronized with the underlying telecast, but rather is receiving the single data file which contains both the video of the telecast and the game data information. The video and game data is then separated by application software resident on the cellular phone for simultaneous display on a single color LCD display.

Since all players receive the same game data at the same time, cheating among players, possible with on demand games, is not possible, and prizes can be awarded.

Benefits

While there is a large potential demand for games of skill for prizes based upon the live telecast of sporting events and syndicated game shows, participation in these games is generally limited to prime time or near prime time viewing on week days, and sporting events on the weekends. The explosion in the popularity of cellular games of short duration indicates that the owners of cellular telephones often find 5-10 minutes during the day to participate in stimulating entertainment work breaks, while commuting to and from work, sometimes even when they are working, amongst other times. The methodologies described herein provide a new and unique form of entertainment. While based on popular television programming, the games are able to be enjoyed either on demand or several times an hour with scheduled start times, since they are generated from television archives. The games are ever changing and are based on programming with a proven huge fan audience. This invention provides the highest quality production value at a fraction of the cost of existing video, computer and cellular games. Other games require the skills of graphic artists and designers, and extensive programming to create full motion 3D graphics in attempt to make games like EA Sports® John Madden Football, or Sony's Jeopardy!® games as close to the actual telecast as possible. This invention repurposes the actual television footage with the production values and excitement of the original broadcasts of these events at a fraction of the cost.

Games with a common start time are able to be played competitively for prizes. While all of these telecasts may have been viewed in the past by a potential competitor, it is highly unlikely that anyone is able to specifically remember the details of a single event seen 5 to 10 years ago. Even so, it is highly likely that these games will be considered games of skill, in that the ability to remember the answers to trivia questions and other tests of recall and memory have been defined as legal games of skill. Thus, these games based on old television footage are able to be played for prizes where laws permit.

FIG. 1 illustrates a graphical representation of the preferred embodiment of the present invention. Initially, a game is produced at a production studio or another location that is capable of producing the game. As described above, a set of television archives 102 are stored from many years ago. For television archives stored in analog format, they are converted into digital format using a known conversion method. A game production tool 104 is utilized to generate one or more game data files to support the competitive game of skill or chance which is precisely synchronized with the digitized video files. In some embodiments, audio is also included with the video and game data files. The game production tool 104 sends the digitized video and game data files to a game scheduling server 106.

The game scheduling server 106 determines a schedule for games to be played in addition to distributing the video and game data files. The game scheduling server 106 communicates with a cellular service operator 108 such as Sprint®, Verizon Wireless® or Cingular® to receive and transmit data through a wireless network 112. The underlying video and game data files are streamed or downloaded to a user's cellular phone 114. As users play the games, their results and scores are calculated and determined with a scoring server 110. In some embodiments, the game scheduling server 106 and the scoring server 110 are contained within the same physical server unit, and in other embodiments, the game scheduling server 106 and the scoring server 110 are separate and communicate with each other. Users are able to view their standings by communicating with the scoring server 110 also.

In some embodiments, users are able to sign up over the Internet 116 for the gaming service. Users are also able to register groups of competitors to compete against. For example, a user is able to log onto a website through the Internet 116 and select usernames of friends to compete against in an on demand game.

Figure 2:
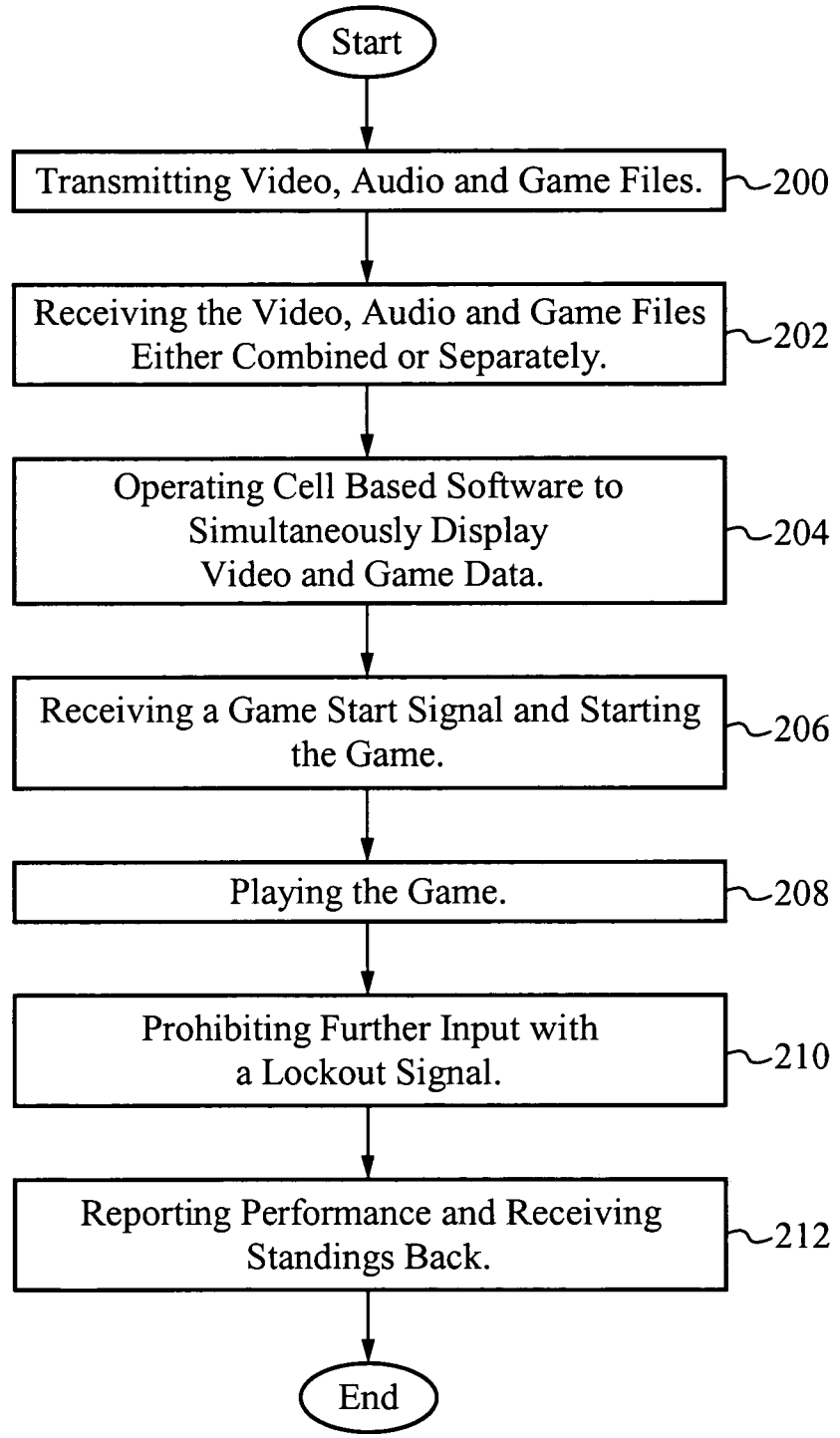
FIG. 2 illustrates a method of utilizing the present invention.

FIG. 2 illustrates a method of utilizing the present invention. In the step 200, video, audio and game files are transmitted to a user's cellular phone. In some embodiments, the files are transmitted separately, and in other embodiments, the video, audio and game data are all combined in one file and are transmitted together. In some embodiments, audio data is not transmitted, for example, because a user chooses to play the game without sound. In the step 202, a user's cellular phone receives the video, audio and game files either combined or separately depending on how they were transmitted. In the step 204, the cellular phone operates cellular phone-based software to simultaneously display video and game data. When appropriate, in the step 206, the cellular phone receives a game start signal and starts the game. Sometimes the start signal is received based on a designated starting time that the user signed up for, such as, 1980 Super Bowl at 4:00 pm. A user is also able to select a game to play from a menu and initiate a game immediately. A user is also able to be a member of an on-demand group where someone else included him in the group and is informed that the group competition has begun and a start signal is sent immediately or when the user is ready. As described above, once the user receives the start signal, the user plays the game on his cellular phone by viewing video clips and game data which includes questions and answers and then selects choices related to the questions about the clip, in the step 208. In the step 210, during game play, when appropriate, a lockout signal prevents further input by the user, so that cheating is not allowed. In the step 212, the cellular phone reports performance data to the scoring server and receives standings information back, so that users are able to see how well they did compared to other competitors.

Figure 3:
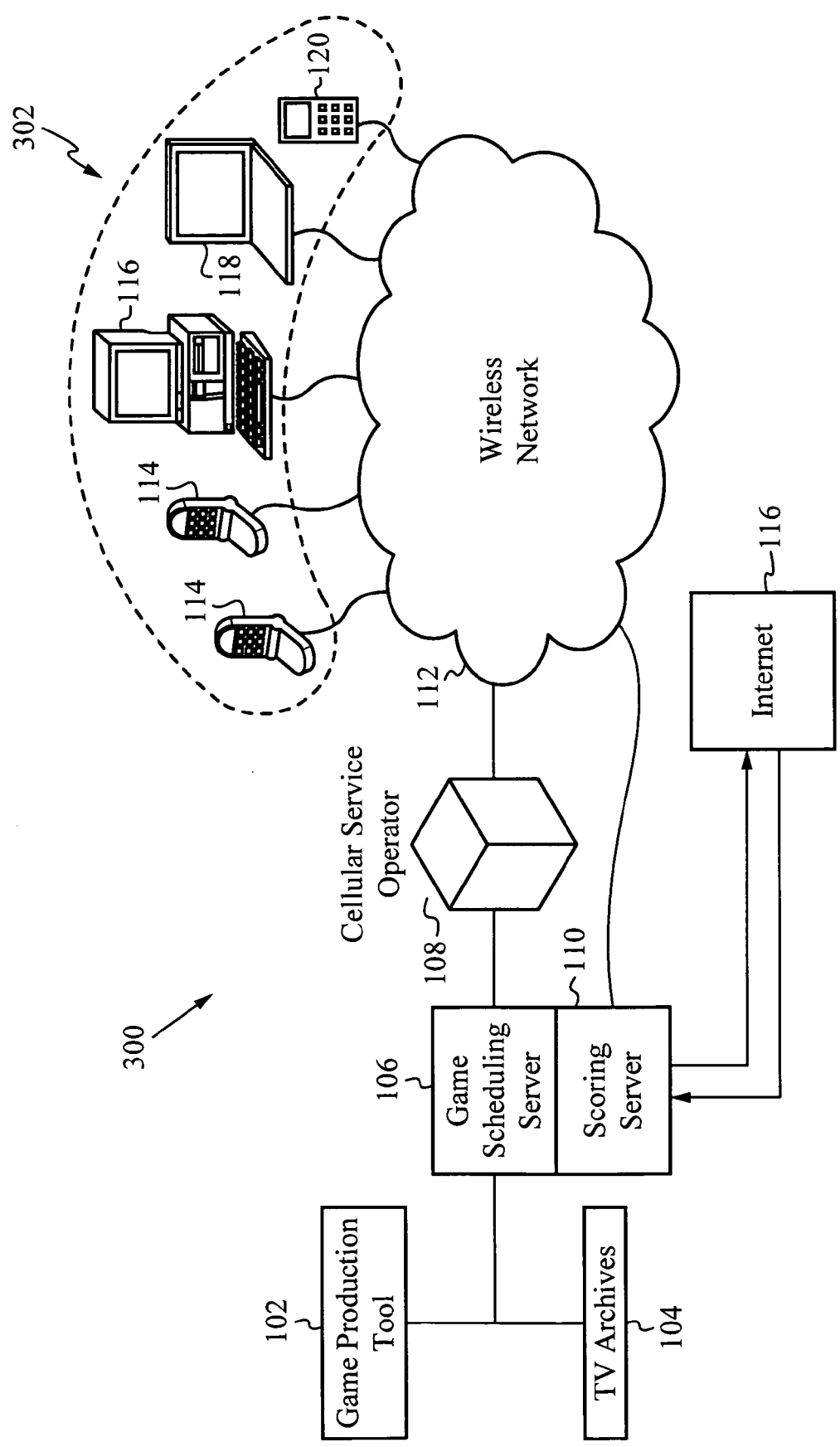
FIG. 3 illustrates a network of devices of the present invention.

FIG. 3 illustrates a network of devices of the present invention. A network of devices 300 includes a game production tool 102, television archives 104, a game scheduling server 106, a cellular service operator 108, a scoring server 110, a wireless network 112 and a plurality of devices 302. In some embodiments, other devices in addition to cellular phones 114 are able to couple to the wireless network and play along, such as personal computers 116, laptop computers 118 and PDAs 120. The game production tool 102 is utilized to generate a game comprising one or more game files, and combine the game files with one or more video files from the television archives after the television archive segment has been digitized. In some embodiments, the game files and the video files are compressed. In some embodiments, digital audio is also combined with the game files and video files. The game files, video files and in some embodiments audio files are stored, in one combined file, on the game scheduling server 106. The game scheduling server 106 also supplies the plurality of devices 302 with a schedule of games through the cellular service operator 108 and the wireless network 112. The scoring server 110 couples to the plurality of devices 302 through the wireless network 112 to receive scoring results and determine/provide standings. In some embodiments, the Internet 116 is utilized to allow users to register or to select a group of competitors for an on demand game. The plurality of devices 302 are utilized by users to receive the requisite game and video data. Each device within the plurality of devices 302 contains software to utilize the game and video data to provide a gaming experience with the archived television program. Through the game scheduling server 106 and the scoring server 110, the plurality of devices 302 are able to be used in competitions where users play the same game at a designated time and based on the correctness of their answers or based on other game conditions, users receive points and those users with the highest point totals are able to win prizes or at least claim to be the most knowledgeable with regards to a certain archived television program.

In an embodiment where a user wants to play a game on demand, the cellular phone 114 communicates with the game scheduling server 106 and other cellular phones within the plurality of devices 302 to inform them of the beginning of a game. For example, a user wants to challenge his friends to a competition related to the television show, The Emmys. The user enters information usable to detect/identify the other users in the group such as their cellular phone number, username or another identifier. The game scheduling server 106 then contacts the other users and provides them with the necessary game files and video files. Only the users included in the group are able to participate in the game and thus only their scores will be compared to allow a group of friends to determine who is the most knowledgeable about The Emmys or some other archived television program.

There are two perspectives of utilizing the present invention. Game producers use a game production tool to develop a game and combine it with digitized television video clips. The combined game and video data is then sent to a game scheduling server where it is able to be transmitted to users' cellular phones. Cellular phone users receive the game and video data after selecting a game to play and when the appropriate time arrives. At that time, the users each play the game, using software on their cellular phones which incorporates the video clips and game data. The video clips are displayed on the users' cellular phones, and they then select choices based on the clips viewed. As the game progresses or after the game is completed, the results of the selections are transmitted to/from the scoring server and then a user is able to see how well they performed. In some embodiments, instead of users playing a game at a set time, users are able to play on-demand wherein a selected group of people play together as described above.

In operation, the present invention allows users to play games on their cellular phones wherein the games are based on archived television programs. Game data and video data are combined into one file and are sent to participating cellular phones so that the required information is received at the same time at each cellular phone. Each cellular phone contains software to manipulate the game and video data so that the user is able to play the game. The game is played by watching video clips and then answering questions/selecting choices related to the video clips using the buttons on the user's cellular phone. User scores are determined based on the answers to the questions. In some embodiments, users are able to win prizes by performing better than others in the games.

Although a cellular phone has been used throughout the present specification as the main exemplary game playing device, it should be understood that any computing device is able to be used within the described method and system.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of playing a game based on archived television programs, comprising:
   a. receiving one or more video files and one or more game data files;
   b. operating a cellular based program to display one or more video clips and game data from the one or more video files and the one or more game data files, wherein the one or more video files and the one or more game data files are simultaneously broadcast to all entrants to the game at a specific time, wherein operating the cellular based program includes receiving a time stamped lockout signal by the cellular based program to prevent additional user input, wherein the game data is displayed simultaneously on the same screen with the one or more video clips; and
   c. determining a score for each entrant of the game at a game server.

2. The method as claimed in claim 1 further comprising receiving a game start signal and starting the game.

3. The method as claimed in claim 1 further comprising playing the game by selecting one or more choices related to the video clips.

4. The method as claimed in claim 1 wherein the one or more video files and the one or more game data files are received in a combined file.

5. The method as claimed in claim 1 wherein the game data is overlayed on the video clips.

6. The method as claimed in claim 1 further comprising collecting the scores and reporting performance of participants to a cellular phone.

7. The method as claimed in claim 1 wherein the one or more video files and the one or more game data files are compressed.

8. The method as claimed in claim 1 wherein the game data contains graphic information in addition to the video clips.

9. The method as claimed in claim 8 wherein the graphic information is displayed as a selected one of crawling information, closed captioned information, a picture in picture and a graphical overlay.

10. The method as claimed in claim 1 wherein the one or more video files and the one or more game data files are received in advance of a scheduled start.

11. The method as claimed in claim 1 further comprising transmitting the one or more video files and the one or more game data files on a transmission selected from the group consisting of a single TCP, UDP, 3G, multicast and broadcast transmission.

12. The method as claimed in claim 11 wherein transmitting is selected from the group consisting of digital broadcasting, individual streaming and downloading.

13. The method as claimed in claim 12 wherein the game is played as a selected one of simultaneously live, on demand and practice.

14. The method as claimed in claim 1 wherein a set of digital audio is received with the one or more video files and the one or more game data files.

15. The method as claimed in claim 1 wherein a user identifies one or more remote competitors to challenge and compete against in a challenge game.

16. The method as claimed in claim 15 wherein after all of the challenged competitors complete the challenge game, results are sent to the challenged competitors including rankings.

17. The method as claimed in claim 15 wherein the user utilizes the Internet to identify the one or more remote competitors to challenge and compete against.

18. The method as claimed in claim 1 wherein the one or more video files and the one or more game data files are pre-produced.

19. The method as claimed in claim 1 wherein the archived television programs are selected from the group consisting of sporting events, game shows and entertainment shows.

20. The method as claimed in claim 1 wherein one or more segments of the archived television programs are included in the one or more video files.

21. The method as claimed in claim 20 wherein the one or more segments are between five minutes and twenty minutes.

22. The method as claimed in claim 1 further comprising digitizing analog video.

23. The method as claimed in claim 1 wherein the one or more video files and the one or more game data files are received over a wireless cellular network.

24. The method as claimed in claim 1 wherein the video clips and the game data are synchronously displayed.

25. The method as claimed in claim 1 wherein a record of episodes of the archived television programs played by the user is maintained on the game server to ensure the user receives a never-before played game by the user.

26. A method of playing a game based on a segment of an archived television program, comprising:
 a. transmitting a set of files from a server over a wireless cellular network, the set of files comprising:
  i. one or more pre-produced video files, wherein the one or more pre-produced video files contain one or more video clips;
  ii. one or more game data files, wherein the one or more game data files contain game data, further wherein the game data contains graphic information in addition to the one or more video clips; and
  iii. one or more audio files;
 b. receiving the set of files on a mobile device, wherein the set of files is simultaneously broadcast to all entrants to the game at a specific time;
 c. operating a cellular based program contained on the mobile device to synchronously display the one or more video clips and the game data, wherein operating the cellular based program includes receiving a time stamped lockout signal at the mobile device to prevent additional user input, wherein the game data is displayed simultaneously on the same screen with the one or more video clips;
 d. playing the game by selecting one or more choices; and
 e. determining a score for each entrant of the game at a game server.

27. The method as claimed in claim 26 wherein the set of files is assembled into a combined file.

28. The method as claimed in claim 26 further comprising collecting the scores and reporting performance of participants to the mobile device.

29. The method as claimed in claim 28 wherein the graphic information is displayed as a selected one of crawling information, closed captioned information, a picture in picture and a graphic overlay.

30. The method as claimed in claim 26 wherein the set of files contains compressed data.

31. The method as claimed in claim 26 wherein the set of files is received in advance of scheduled start.

32. The method as claimed in claim 26 wherein transmitting the set of files is on a transmission selected from the group consisting of a single TCP, UDP, 3G, multicast and broadcast transmission.

33. The method as claimed in claim 32 wherein transmitting is selected from the group consisting of digital broadcasting, individual streaming and downloading.

34. The method as claimed in claim 33 wherein the game is played as a selected one of simultaneously live, on demand and practice.

35. The method as claimed in claim 26 wherein a user identifies one or more remote competitors to challenge and compete against in a challenge game.

36. The method as claimed in claim 35 wherein after all of the challenged competitors complete the challenge game, results are sent to the challenged competitors including rankings.

37. The method as claimed in claim 26 wherein the archived television program is selected from the group consisting of sporting events, game shows and entertainment shows.

38. A system for producing and distributing a game based on archived television programs, comprising:
 a. a game production device for grouping one or more video clips and game data into a set of files;

b. a first server coupled to the game production device, wherein the first server receives and transmits the set of files, wherein the set of files is simultaneously broadcast to all entrants to the game at a specific time, further wherein the first server transmits a time stamped lockout signal to prevent additional user input, wherein the game data is displayed simultaneously on the same screen with the one or more video clips; and c. a second server coupled to the first server, wherein the second server determines a score for each entrant of the game.

39. The system as claimed in claim 38 wherein the set of files is assembled into a combined file.

40. The system as claimed in claim 38 wherein the video clips and the game data allow a user to play the game by selecting one or more choices related to the video clips.

41. The system as claimed in claim 38 wherein the second server is used for determining standings and communicating the standings to participants.

42. The system as claimed in claim 41 wherein the first server and the second server are contained within a single server device.

43. The system as claimed in claim 38 further comprising a cellular service operator coupled to the first server and a wireless network for transmitting the set of files to the wireless network.

44. The system as claimed in claim 38 wherein the set of files contains compressed data.

45. The system as claimed in claim 38 wherein the set of files is transmitted on a transmission selected from the group consisting of a single TCP, UDP, 3G, multicast and broadcast transmission.

46. The system as claimed in claim 45 wherein transmitting the set of files is selected from the group consisting of digital broadcasting, individual streaming and downloading.

47. The system as claimed in claim 46 wherein the game is played as a selected one of simultaneously live, on demand and practice.

48. The system as claimed in claim 38 wherein a set of digital audio is grouped into the set of files.

49. The system as claimed in claim 38 wherein the video clips and the game data are pre-produced.

50. The system as claimed in claim 38 wherein the archived television programs are selected from the group consisting of sporting events, game shows and entertainment shows.

51. The system as claimed in claim 38 wherein one or more segments of the archived television programs are included in the video clips.

52. The system as claimed in claim 51 wherein the one or more segments are between five minutes and twenty minutes.

53. A device for playing a game based on archived television programs, comprising a cellular phone, wherein the cellular phone receives a set of files after the set of files is simultaneously broadcast to all entrants to the game at a specific time, wherein the set of files contain one or more video clips and game data and utilizes a program and the set of files to present the one or more video clips and the game data to a user that entered to the game, wherein the program is configured for receiving a time stamped lockout signal at the cellular phone to prevent additional user input, wherein the game data is displayed simultaneously on the same screen with the one or more video clips, wherein the user identifies one or more remote competitors to challenge and compete against in a challenge game, and further wherein the cellular phone transmits responses input by the user when playing the game to a game server that determines a score of the user for the game.

54. The device as claimed in claim 53 wherein the set of files is assembled into a combined file.

55. The device as claimed in claim 53 wherein the game data is overlayed on the video clips.

56. The device as claimed in claim 53 wherein the game data contains graphic information in addition to the video clips.

57. The device as claimed in claim 56 wherein the graphic information is displayed as a selected one of crawling information, closed captioned information, a picture in picture and a graphic overlay.

58. The device as claimed in claim 53 wherein the video clips and the game data are synchronized.

59. The device as claimed in claim 53 wherein the game is transmitted to the cellular phone using a selected one of digital broadcasting, individual streaming and downloading.

60. The device as claimed in claim 53 wherein the game is played as a selected one of simultaneously live, on demand and practice.

61. The device as claimed in claim 53 wherein after all of the challenged competitors complete the challenge game, results are sent to the challenged competitors including rankings.

62. The device as claimed in claim 53 wherein standings information is received from the game server.

63. The device as claimed in claim 53 wherein the video clips and the game data are pre-produced.

64. The device as claimed in claim 53 wherein the archived television programs are selected from the group consisting of sporting events, game shows and entertainment shows.

65. The device as claimed in claim 53 wherein one or more segments of the archived television programs are included in the video clips.

66. A network of devices for playing a game based on archived television programs, comprising:

a. a game production device for combining one or more video clips with game data into a combined file;

b. a first server coupled to the game production device, wherein the server receives and transmits the combined file, wherein the first server sends a time stamped lockout signal to prevent additional user input, wherein the game data is displayed simultaneously on the same screen with the one or more video clips;

c. a plurality of devices communicating with the first server through a wireless network, wherein the plurality of devices receive the combined file and utilize a program and the combined file to present the one or more video clips and the game data to a user, wherein the combined file is simultaneously broadcast to all entrants to the game at a specific time; and d. a second server coupled to the first server, wherein the second server determines a score for each entrant of the game.

67. The network of devices as claimed in claim 66 wherein the video clips and the game data allow the user to play the game by selecting one or more choices related to the video clips.

68. The network of devices as claimed in claim 66 wherein the plurality of devices are selected from the group consisting of cellular phones, personal computers, laptops and PDAs.

69. The network of devices as claimed in claim 66 wherein the combined file is received substantially simultaneously at each of the devices.

70. The network of devices as claimed in claim 66 wherein the second server receives the scoring data and determines standings.

71. The network of devices as claimed in claim 70 wherein the first server and the second server are contained within a single server device.

72. The network of devices as claimed in claim 66 wherein standings information and results are transmitted to participants.

73. The network of devices as claimed in claim 66 further comprising a cellular service operator coupled to the first server and the wireless network for transmitting the combined file to the wireless network.

74. The network of devices as claimed in claim 66 wherein the game data is overlayed on the video clips.

75. The network of devices as claimed in claim 66 wherein the combined file contains compressed data.

76. The network of devices as claimed in claim 66 wherein the game data contains graphic information in addition to the video clips.

77. The network of devices as claimed in claim 76 wherein the graphic information is displayed as a selected one of crawling information, closed captioned information, a picture in picture and a graphic overlay.

78. The network of devices as claimed in claim 66 wherein the combined file is transmitted on a selected one of a single TCP, UDP, 3G, multicast and broadcast transmission.

79. The network of devices as claimed in claim 78 wherein transmitting the combined file is selected from the group consisting of digital broadcasting, individual streaming and downloading.

80. The network of devices as claimed in claim 79 wherein the game is played as a selected one of simultaneously live, on demand or practice.

81. The network of devices as claimed in claim 66 wherein a set of digital audio is combined into the combined file.

82. The network of devices as claimed in claim 66 wherein the user identifies one or more remote competitors to challenge and compete against in a challenge game.

83. The network of devices as claimed in claim 82 wherein the competitors are able to choose when to play the challenge game.

84. The network of devices as claimed in claim 83 wherein after all of the challenged competitors complete the challenge game, results are sent to the challenged competitors including rankings.

85. The network of devices as claimed in claim 66 wherein the video clips and game data are pre-produced.

86. The network of devices as claimed in claim 66 wherein the archived television programs are selected from the group consisting of sporting events, game shows and entertainment shows.

87. The network of devices as claimed in claim 66 wherein one or more segments of the archived television programs are included in the video clips.

88. The network of devices as claimed in claim 87 wherein the one or more segments are between five minutes and twenty minutes.

89. The network of devices as claimed in claim 66 wherein the video and the game data are synchronized.

90. The network of devices as claimed in claim 66 further comprising an Internet for registering a group of competitors.

91. A method of playing a game comprising:
  a. receiving one or more pre-produced video files and one or more game data files;
  b. operating a cellular based program to display one or more video clips and game data from the one or more pre-produced video files and the one or more game data files, wherein the one or more pre-produced video files and the one or more game data files are simultaneously broadcast to all entrants to the game at a specific time, wherein operating the cellular based program includes receiving a time stamped lockout signal by the cellular based program to prevent additional user input, wherein the game data is displayed simultaneously on the same screen with the one or more video clips; and
  c. determining a score for each entrant of the game at a game server.

92. The method as claimed in claim 91 further comprising playing the game by viewing the video clips and making a selection from a plurality of choices related to the video clips.

93. The method as claimed in claim 92 wherein playing the game further includes providing a positive result to a user when a correct selection is made from the plurality of choices.

94. The method as claimed in claim 91 wherein the one or more pre-produced video files comprise one or more videos produced and recorded specifically for playing the game.

95. A method of playing a game comprising:
  a. receiving one or more pre-recorded video files and one or more game data files;
  b. operating a cellular based program to display one or more video clips and game data from the one or more pre-recorded video files and the one or more game data files, wherein the one or more pre-recorded video files and the one or more game data files are simultaneously broadcast to all entrants to the game at a specific time, wherein operating the cellular based program includes receiving a time stamped lockout signal by the cellular based program to prevent additional user input, wherein the game data is displayed simultaneously on the same screen with the one or more video clips; and
  c. determining a score for each entrant of the game at a game server.

96. The method as claimed in claim 95 further comprising playing the game by viewing the video clips and making a selection from a plurality of choices related to the video clips.

97. The method as claimed in claim 96 wherein playing the game further includes providing a positive result to a user when a correct selection is made from the plurality of choices.

98. The method as claimed in claim 95 wherein the one or more pre-recorded video files comprise one or more videos produced and recorded specifically for playing the game.

99. A method of playing a game comprising:
  a. receiving one or more video files on a mobile device, wherein the one or more video files are simultaneously broadcast to all entrants to the game at a specific time, wherein the specific time occurs at periodic intervals;
  b. displaying the one or more video files on the mobile device;
  c. presenting a plurality of choices on the mobile device and receiving a time stamped lockout signal at the mobile device to prevent additional user input, wherein the game data is displayed simultaneously on the same screen with the one or more video clips, further wherein the game data and audio are synchronized with the one or more video clips using an application stored on the mobile device;
d. selecting a choice from the plurality of choices on the mobile device;
e. providing a positive result when a correct selection from the plurality of choices is made; and
f. determining a score for each entrant of the game at a game server.

100. The method as claimed in claim 99 wherein the plurality of choices are based on the one or more video files.

101. The method as claimed in claim 100 wherein the plurality of choices are based on situations arising in the one or more video files.

102. The method as claimed in claim 100 wherein the one or more video files each include a person.

103. The method as claimed in claim 99 wherein further comprising receiving one or more game data files.

104. The method as claimed in claim 99 wherein the one or more video files are pre-recorded.

105. The method as claimed in claim 99 wherein the positive result includes a correct selection score.

106. The method as claimed in claim 99 wherein the one or more video files comprise one or more videos produced and recorded specifically for playing the game.

107. The method as claimed in claim 99 wherein the one or more video files comprise one or more videos custom produced for playing the game.

108. The device as claimed in claim 53 wherein the cellular phone receives the set of files upon demand by the user of the cellular phone.

109. The method as claimed in claim 99 wherein the game data is displayed on the same screen with the video clips such that when the game data is displayed, the video clips are minimized, and when the video clips are displayed, the game data is minimized.

110. The method as claimed in claim 99 wherein the game data is displayed on the same screen with the video clips utilizing a picture in picture implementation.

111. The method as claimed in claim 99 wherein the one or more video files, the game data and audio are combined before being sent, and are received by the mobile device.

* * * * *